US012527374B2

(12) United States Patent
Ku et al.

(10) Patent No.: US 12,527,374 B2
(45) Date of Patent: Jan. 20, 2026

(54) ASSEMBLED SIMULATION POTTED PLANT

(71) Applicant: GRAND CHINA FLORAL CRAFT MANUFACTURING CO. LTD., ZhongShan (CN)

(72) Inventors: Benedict Wei Chun Ku, ZhongShan (CN); Howard Cheuk Wei Ku, ZhongShan (CN)

(73) Assignee: GRAND CHINA FLORAL CRAFT MANUFACTURING CO. LTD., ZhongShan (CN)

( * ) Notice: Subject to any disclaimer, the term of this patent is extended or adjusted under 35 U.S.C. 154(b) by 205 days.

(21) Appl. No.: 18/227,635

(22) Filed: Jul. 28, 2023

(65) Prior Publication Data

US 2024/0041142 A1 Feb. 8, 2024

Related U.S. Application Data

(63) Continuation of application No. PCT/CN2022/143292, filed on Dec. 29, 2022.

(30) Foreign Application Priority Data

Aug. 3, 2022 (CN) .......................... 202222038199.X

(51) Int. Cl.
  *A41G 1/00* (2006.01)
(52) U.S. Cl.
  CPC .................................... *A41G 1/00* (2013.01)
(58) Field of Classification Search
  CPC .......................................................... A41G 1/00
  USPC ......................................................... 428/3, 23
  See application file for complete search history.

(56) References Cited

FOREIGN PATENT DOCUMENTS

| CN | 103840316 A | 6/2014 |
| CN | 215455693 U | 1/2022 |
| CN | 215683617 U | * 2/2022 |
| CN | 218043917 U | 12/2022 |
| CN | 218123767 U | 12/2022 |
| GB | 2158710 A | 11/1984 |
| JP | 2003129320 A | 5/2003 |

OTHER PUBLICATIONS

Gu et al., CN215683617U Google Patents machine translation Apr. 11, 2025, Feb. 1, 2022, entire translation (Year: 2022).*

* cited by examiner

*Primary Examiner* — Katherine A Christy
(74) *Attorney, Agent, or Firm* — JEEN IP LAW, LLC

(57) ABSTRACT

An assembled simulation potted plant is provided, which includes a pot body and plants; third connecting portions are disposed on the pot body, at least two plants are provided, first connecting portions are disposed at lower parts of the plants, second connecting portions are disposed at upper parts of the plants, the connecting portions fit with the first connecting portions; the second connecting portions are disposed at an upper part, or the third connecting portions on the pot body are provided. The plants may be installed vertically in turn, the simulation potted plant has a great height variation range. Plants can be installed in the pot body, so the assembled simulation potted plant has a great horizontal dimension variation range, various different optimal states are greatly different; users may obtain a variety of greatly different potted plant shapes when purchasing one assembled simulation potted plant.

16 Claims, 12 Drawing Sheets

ASSEMBLED SIMULATION POTTED PLANT

CROSS-REFERENCE TO RELATED APPLICATIONS

The present application is a U.S. continuation of International Patent Application No. PCT/CN2022/143292 filed on Dec. 29, 2022, which claims foreign priority of Chinese Patent Application No. 202222038199X, filed on Aug. 3, 2022 in the State Intellectual Property Office of China, the contents of all of Which are hereby incorporated by reference.

TECHNICAL FIELD

The present disclosure relates to a potted plant, in particular to an assembled simulation potted plant.

BACKGROUND

The simulation potted plant is a so on upholstery, and widely loved by consumers due to its great convenience and not needing to culture artificially. Using the simulation potted plant may beautify the indoor environment, and also achieve the effect of relaxing mood.

The patent literature No. CN108720141A discloses a multi-functional simulation potted plant, including a flower pot, a storage cavity with an upward opening is disposed in the flower pot, a positioning iron is placed inside the storage cavity, a positioning convex rod with an external thread is integrally disposed in a middle of an upper face of the positioning iron, the positioning convex rod is in threaded connection with a flexible conduit, on which a simulation bark jacket is sleeved, an annular groove is formed in an upper part of an inner wall face of the flower pot, a flower pot cover plate is sleeved on a lower part of the flexible conduit, a lower face of the flower pot cover plate resists to a bottom face of the annular groove, and an upper face of the flower pot cover plate is equipped with a simulation soil layer. The simulation bark jacket is successively equipped with a non-woven fabric base layer, a steel wire mesh positioning layer and a plastic surface layer from inside to outside. With a reasonable structural design, a simple structure and detachable component, the technical solution indeed achieves the purpose of convenient transportation and maintenance to some extent, but still exists the following deficiencies: all simulation branches can only be installed on the same flexible conduit, a longitudinal dimension of the same potted plant has been roughly decided by a height of the flexible conduit, and a horizontal dimension of the same potted plant has been decided by shapes of the simulation branches; and the longitudinal dimension and the horizontal dimension of the simulation potted plant in the prior art have smaller variable ranges, and the different optional shapes are not greatly different.

SUMMARY

In order to solve the above-mentioned technical problem, the objective of the present disclosure is to provide an assembled simulation potted plant, and a longitudinal dimension and a horizontal dimension of the simulation potted plant have great variable ranges, and the different optional shapes are greatly different.

The technical solution adopted to solve the problem in the present disclosure is as follows:

including a pot body and plants; third connecting portions are disposed on the pot body, at least two plants are provided, first connecting portions are disposed at lower parts of the plants, and second connecting portions are disposed at upper parts of the plants, and both of the second connecting portions and the third connecting portions fit with the first connecting portion;

a plurality of second connecting portions are disposed at an upper part of one plant, and at the same one third connecting portion is disposed on the pot body; or a plurality of third connecting portions are disposed on the pot body, and at the same time one second connecting portion is disposed at the upper part of one plant; or a plurality of second connecting portions are disposed at the upper part of one plant, and at the same time a plurality of third connecting portions are disposed on the pot body;

that is, the quantity of at least one of the second connecting portions on the same plant and the third connecting portions on the same pot body is multiple.

In the present disclosure, the plants may be mutually connected through the first connecting portions and the second connecting portions, and the plants may also be installed in the pot body through the first connecting portions and the third connecting portions.

When one plant is installed in the pot body and other plants are installed vertically in turn, the assembled simulation potted plant in the present disclosure is in a state of the largest longitudinal dimension.

When a plurality of second connecting portions are disposed at an upper part of one plant and one third connecting portion is disposed on the pot body, and the plurality of second connecting portions are all plugged with other plants, the assembled simulation potted plant has a greater horizontal dimension.

When a plurality of third connecting portions are disposed on the pot body and one second connecting portion is disposed at the upper part of one plant, and the plurality of third connecting portions are all installed with the plants, the assembled simulation potted plant is in a state of the largest horizontal dimension.

When the plurality of second connecting portions are disposed at the upper part of one plant and the plurality of third connecting portions are also disposed on the pot body, and the plurality of third connecting portions are all installed with the plants, the assembled simulation potted plant is in a state of the largest horizontal dimension.

Since the plants can be installed vertically in turn, the assembled simulation potted plant has a great height variation range. All the plants can be directly installed in the pot body through the first connecting portions and the third connecting portions, so the assembled simulation potted plant has a great horizontal dimension variation range, and various different optimal states or shapes are greatly different; and users may obtain a variety of greatly different shapes when purchasing one assembled simulation potted plant.

The plants include a first plant, on which at least two second connecting portions are disposed, and at least two other plants may be installed on the first plant, in order to increase the modeling type of the assembled simulation potted plant.

The plants also include second plants, only one second connecting portion is disposed at an upper part of each second plant, a plurality of second plants may be installed on each first plant at the same time, one second plant may also be installed on another second plant, and the second plants can also be directly installed in the pot body.

The quantity of the second plants is at least two, and leaves are disposed on the second plants.

The third connecting portions and the first connecting portions are all hole-shaped, the second connecting portions are columnar, the third connecting portions and the first connecting portions are all plugged with the second connecting portions, and the advantages of simple structure and low cost are achieved by setting the hole-shaped third connecting portions and the first connecting portions as well as the columnar second connecting portions.

Or the technical solution that the third connecting portions and the first connecting portions are set as columnar, and at the same time the second connecting portions are set as hole-shaped may be adopted. The third connecting portions and the first connecting portions may also be set as female buckles, and at the same time the second connecting portions are set as male buckles. The third connecting portions and the first connecting portions may also be set as male buckles, and at the same time the second connecting portions are set as female buckles. The third connecting portions, the first connecting portions and the second connecting portions may be set as magnets.

Positioning bulges are disposed on the first connecting portions, positioning grooves fitting with the positioning bulges are formed in the second connecting portions, and the positioning bulges are plugged in the positioning grooves.

The pot body includes a main pot and a filling member disposed in the main pot, and the third connecting portions are disposed on the filling member.

The filling member is sheet-like, a step is disposed at an upper part of the main pot, and the filling member is placed on the step.

Further including male plugs and female plugs, one of the male plugs and the female plugs is fixed on the first connecting portions while the other is fixed on the second connecting portions; the male plugs and the female plugs are made of engineering plastics or metal, and the material of the male plugs and the female plugs is different from that of the plants. The plants in the present disclosure are heavier due to the feature with leaves, and therefore in the preferred technical solution, the male plugs and the female plugs made of the engineering plastics or metal are adopted to connect the different plants or connect the plants and the pot body.

The male plugs and the female plugs are integrally molded with the plants through inlaying injection molding.

One of the male plugs and the female plugs is equipped with an installation groove while the other is equipped with a round hole; a throat is disposed at a top of the installation groove, a spring and a steel ball are installed inside the installation groove, an outer diameter of the steel ball is greater than a diameter of the throat, and the steel ball can stretch out of the throat partially and be affixed to the round hole under the thrust action of the spring.

One of the male plugs and the female plugs is equipped with a positioning column while the other is equipped with a groove fitting with the positioning column; and when the positioning column is inserted into the groove, the steel ball can be plugged with the round hole.

One end that each male plug is closed to each plant is equipped with a first plugging portion, one end that each male plug is away from each plant is equipped with a second plugging portion, and the positioning column is disposed on the first plugging portion; the installation groove, the steel ball and the spring are all installed on the second plugging portion, and a longitudinal sectional area of the first plugging portion is greater than that of the second plugging portion; and a third plugging portion fitting with the first plugging portion is disposed in each female plug, a fourth plugging portion fitting with the second plugging portion is disposed in each female plug, the first plugging portion is plugged with the third plugging portion, the second plugging portion is plugged with the fourth plugging portion, and at least one place between the first plugging portion and the third plugging portion is in transition fit with at least one place between the second plugging portion and the fourth plugging portion.

A first spherical surface is disposed at a root of each male plug, a second spherical surface fitting with the first spherical surface is disposed at a top of each female plug, and the first spherical surface fits with the second spherical surface.

A first plane is disposed at an edge of the first spherical surface, a second plane is disposed at an edge of the second spherical surface, the first plane fits with the second plane, and an outer diameter of the first plane is equal to that of the second plane.

The male plugs and the female plugs are both prismatic.

The present disclosure has the following beneficial effects:

when one plant is installed in the pot body and other plants are installed vertically in turn, the assembled simulation potted plant in the present disclosure is in a state of the largest longitudinal dimension;

when a plurality of second connecting portions are disposed at an upper part of one plant and one third connecting portion is disposed on the pot body, and the plurality of second connecting portions are all plugged with other plants, the assembled simulation potted plant has a greater horizontal dimension;

when a plurality of third connecting portions are disposed on the pot body and one second connecting portion is disposed at the upper part of one plant, and the plurality of third connecting portions are all installed with the plants, the assembled simulation potted plant is in a state of the largest horizontal dimension;

when the plurality of second connecting portions are disposed at the upper part of one plant and the plurality of third connecting portions are also disposed on the pot body, and the plurality of third connecting portions are all installed with the plants, the assembled simulation potted plant is in a state of the largest horizontal dimension;

since the plants can be installed vertically in turn, the assembled simulation potted plant has a great height variation range. All the plants can be directly installed in the pot body through the first connecting portions, so the assembled simulation potted plant has a great horizontal dimension variation range; and various different optimal states or shapes are greatly different; and users may obtain a variety of greatly different shapes when purchasing one assembled simulation potted plant.

BRIEF DESCRIPTION OF DRAWINGS

The present disclosure is further described below in combination with drawings and specific implementation modes.

Figure 1:
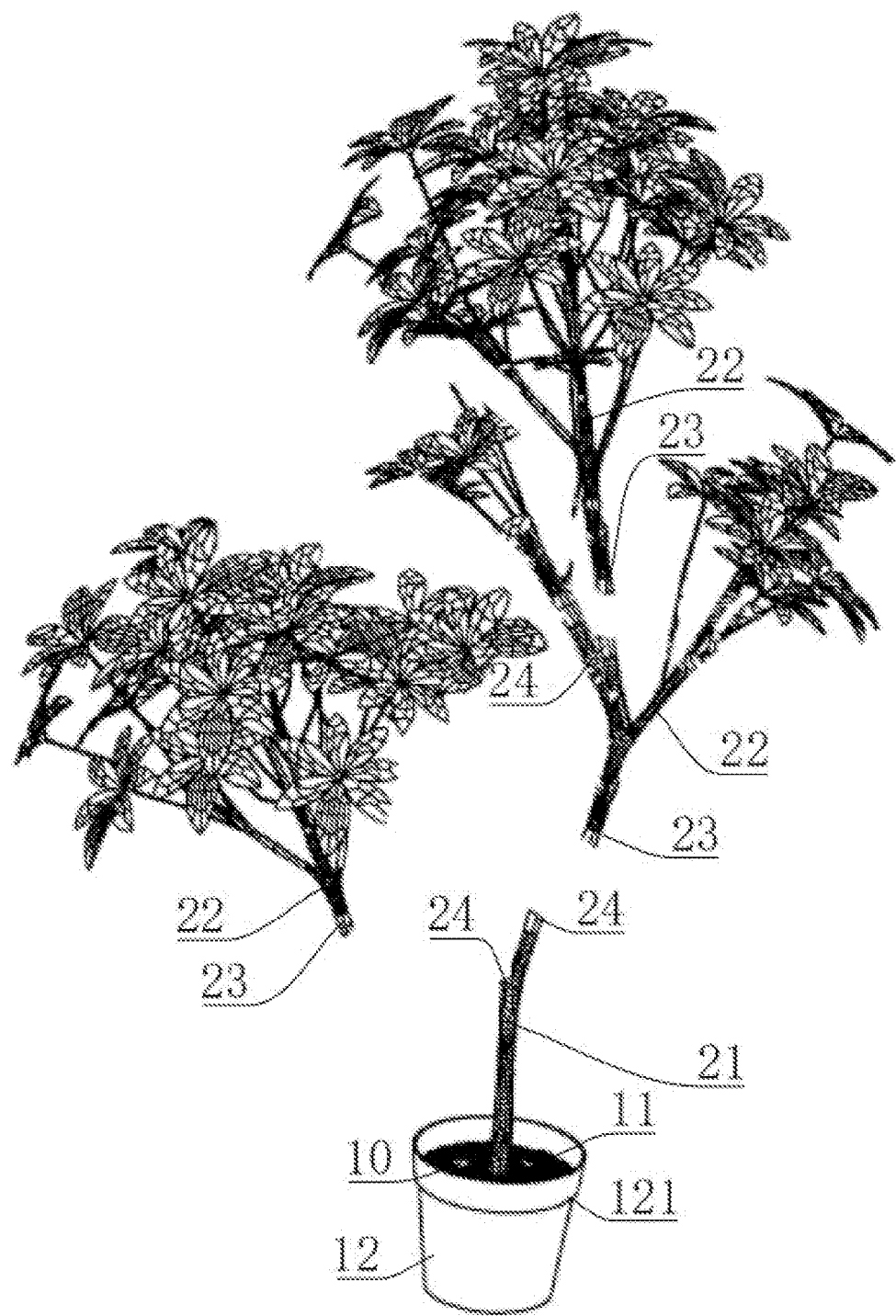
FIG. 1 is an exploded diagram of an assembled simulation potted plant in the present disclosure.

In the drawings: 21—first plant, 22—second plant, 23—first connecting portion, 231—positioning bulge, 24—second connecting portion, 241—positioning groove, 10—third connecting portion, 11—filling member, 12—main pot, 121—step, 3—first plane, 4—second plane, 100—male plug, 101—steel ball, 102—positioning column, 103—first connecting portion, 104—second connecting portion, 105—first spherical surface, 20—female plug, 201—round hole, 202—groove, 203—third connecting portion, 204—fourth connecting portion, 205—second spherical surface.

DETAILED DESCRIPTION

The specific embodiments of the present disclosure are described in detail in this part, the better embodiments of the present disclosure are presented in the drawings, which are configured to supplement the description of the written part of the specification by figures, so that people can directly and vividly understand each technical feature and the whole technical solution, but not be understood as limitations to the present disclosure.

Referring to FIGS. 1 to 7, which are embodiments of the present disclosure.

Figure 7:
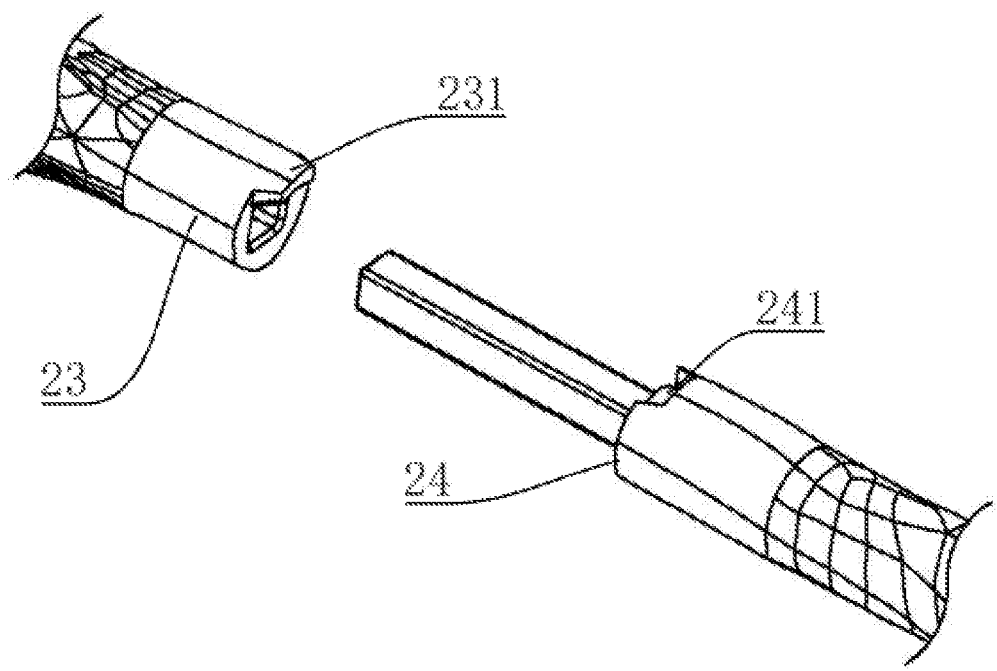
FIG. 7 is a structural schematic diagram of a first connecting portion and a second connecting portion.
Figure 8:
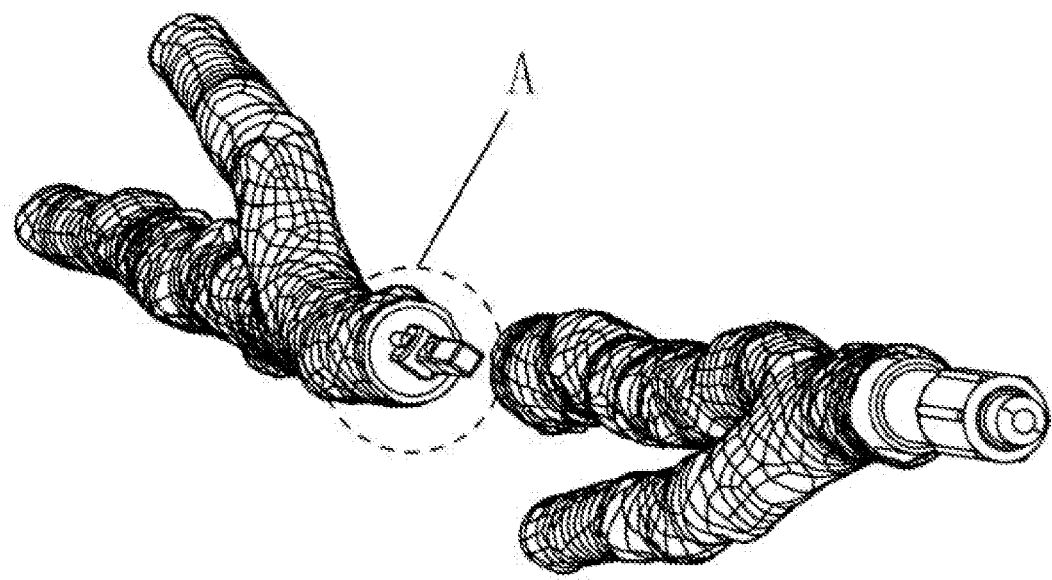
FIG. 8 is a structural schematic diagram I of a preferred implementation mode in the present disclosure.
Figure 9:
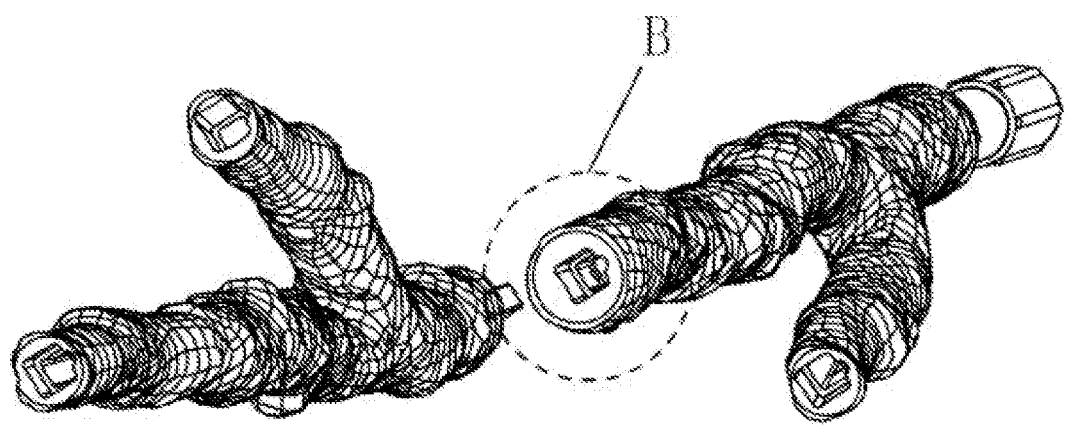
FIG. 9 is a structural schematic diagrams of a preferred implementation mode in the present disclosure.
Figure 10:
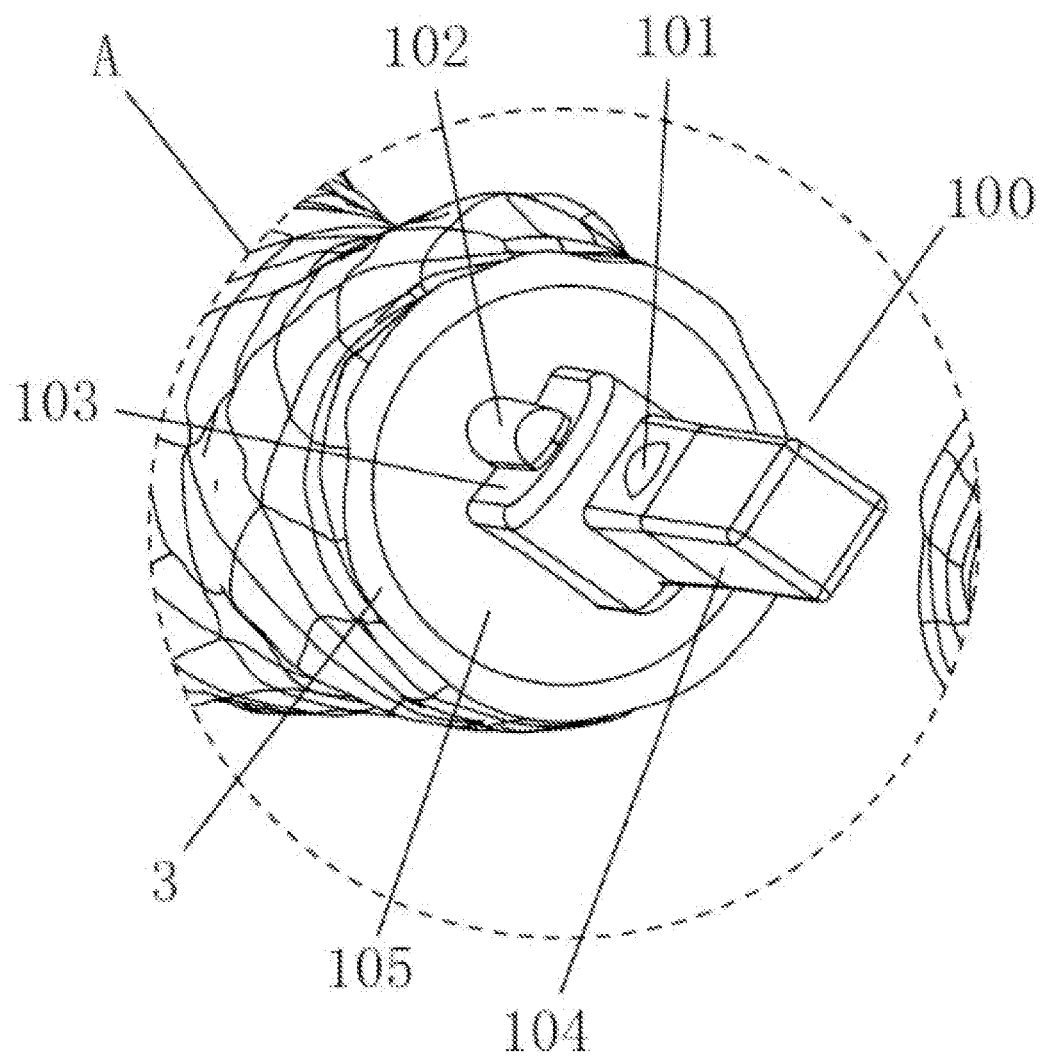
FIG. 10 is an enlarged schematic diagram of a structure at part A in FIG. 8.
Figure 11:
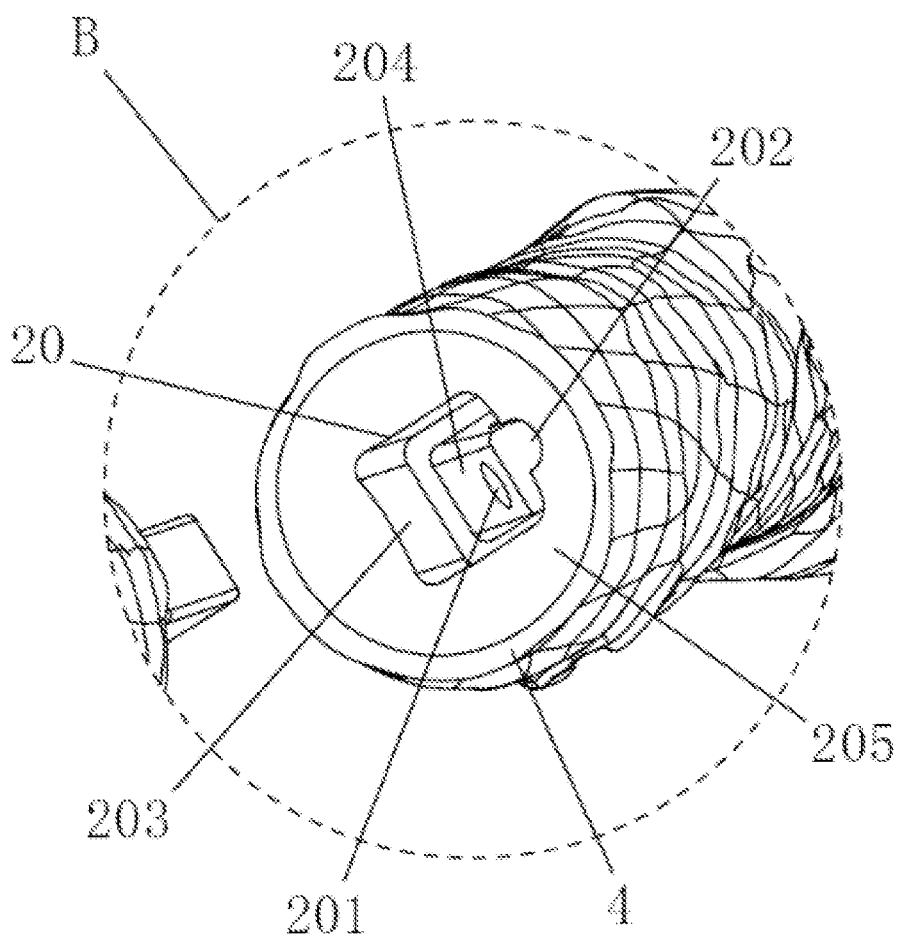
FIG. 11 is an enlarged schematic diagram of a structure at part B in FIG. 9.
Figure 12:
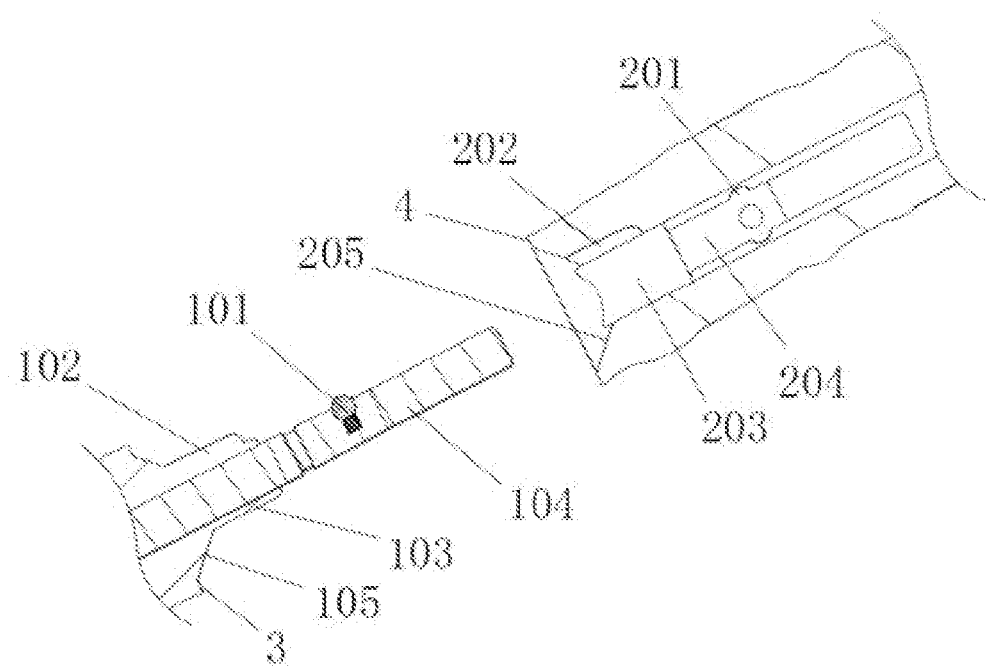
FIG. 12 is a profile of a partial structure in the present disclosure.

Including a pot body and plants;
the pot body includes a main pot 12 and a filling member 11 disposed in the main pot 12, the filling member 11 is sheet-like, a step 121 is disposed at an upper part of the main pot 12, the filling member 11 is placed on the step 121, a plurality of third connecting portions 10 are disposed on the filling member 11, and the third connecting portions 10 are hole-shaped;
the plants include a first plant 21 and second plants 22, the quantity of the first plant 21 is one, the quantity of the second plants 22 is at least three, the lower part of the first plant 21 and the second plants 22 are all equipped with one first connecting portions 23 respectively, and a plurality of second connecting portions 24 are disposed at the upper part of the first plant 21; the upper parts of the second plants 22 are only equipped with one second connecting portion 24 respectively, and leaves are disposed on the second plants 22; and the first connecting portions 23 are hole-shaped, and the second connecting portions 24 are columnar;
a hole diameter of each third connecting portion 10 is the same as that of each first connecting portion 23; and
further, referring to FIG. 7, positioning bulges 231 are disposed on the first connecting portions 23, positioning grooves 241 fitting with the positioning bulges 231 are formed in the second connecting portions 24, and the positioning bulges 231 are plugged in the positioning grooves 241.

Figure 2:
FIG. 2 is a structural schematic diagram of a first installation state of an assembled simulation potted plant in the present disclosure.

Referring to FIG. 2, which is a structural schematic diagram of a first installation state of an assembled simulation potted plant in the present disclosure. The first plant 21 is plugged on one third connecting portion 10 in the pot body, three second plants 22 that are vertically installed in turn are plugged on the first plant 21, and at this time the assembled simulation potted plant has the maximum height.

Figure 3:
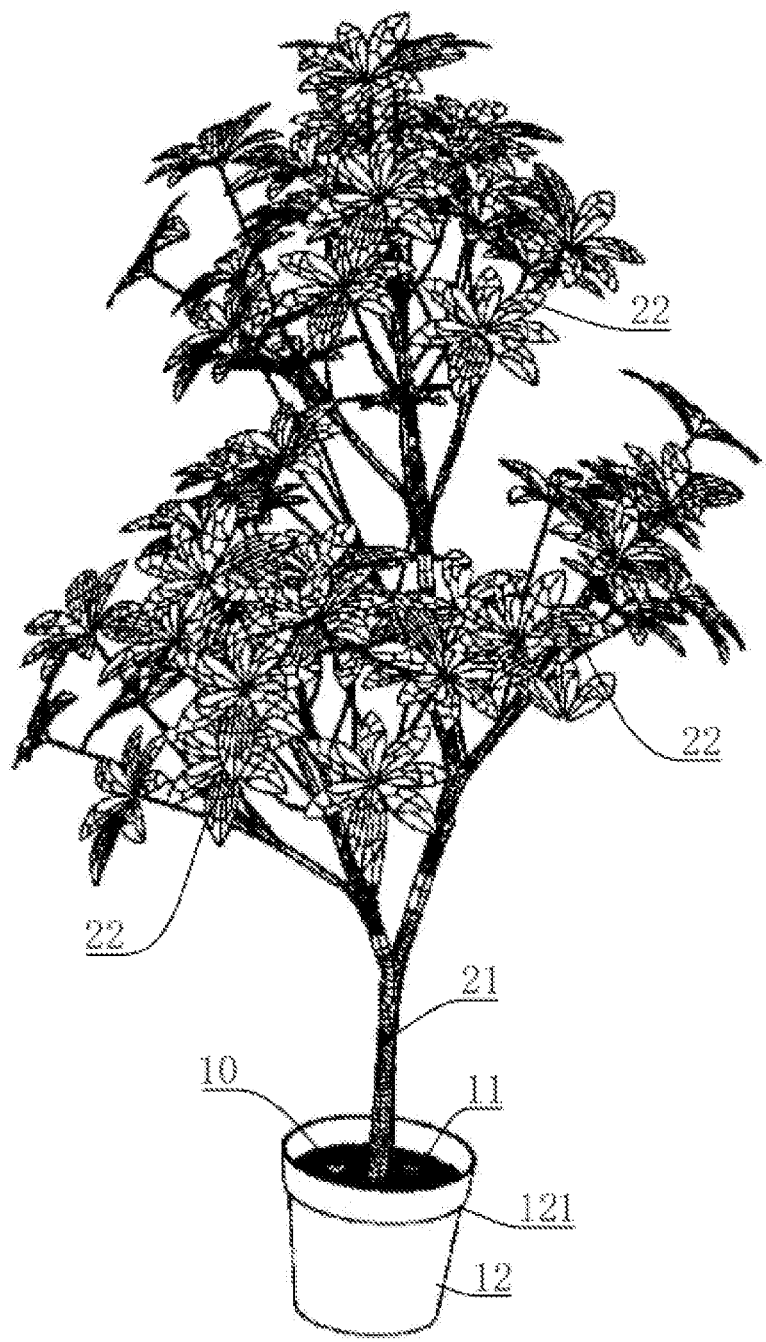
FIG. 3 is a structural schematic diagram of a second installation state of an assembled simulation potted plant in the present disclosure.

Referring to FIG. 3, which is a structural schematic diagram of a second installation state of an assembled simulation potted plant in the present disclosure. The first plant 21 is plugged on one third connecting portion 10 in the pot body, two second plants 22 are plugged on the first plant 21, and the remaining second plant 22 is plugged on one of the two second plants.

Figure 4:
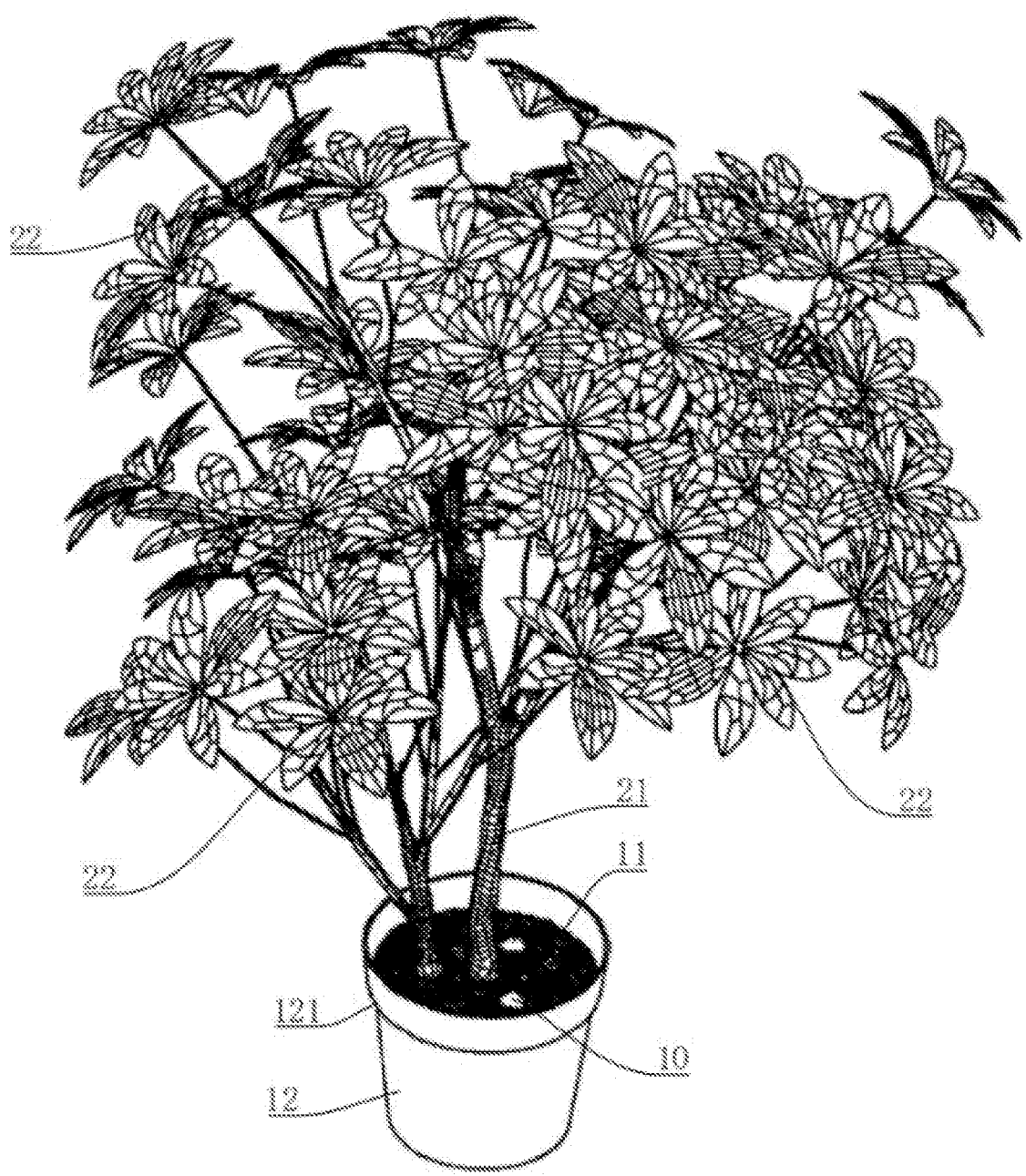
FIG. 4 is a structural schematic diagram of a third installation state of an assembled simulation potted plant in the present disclosure.

Referring to FIG. 4, which is a structural schematic diagram of a third installation state of an assembled simulation potted plant in the present disclosure. The first plant 21 is plugged on one third connecting portion 10 in the pot body, two second plants 22 are plugged on the first plant 21, and the remaining second plant 22 is plugged on one third connecting portion 10 in the pot body.

Figure 5:
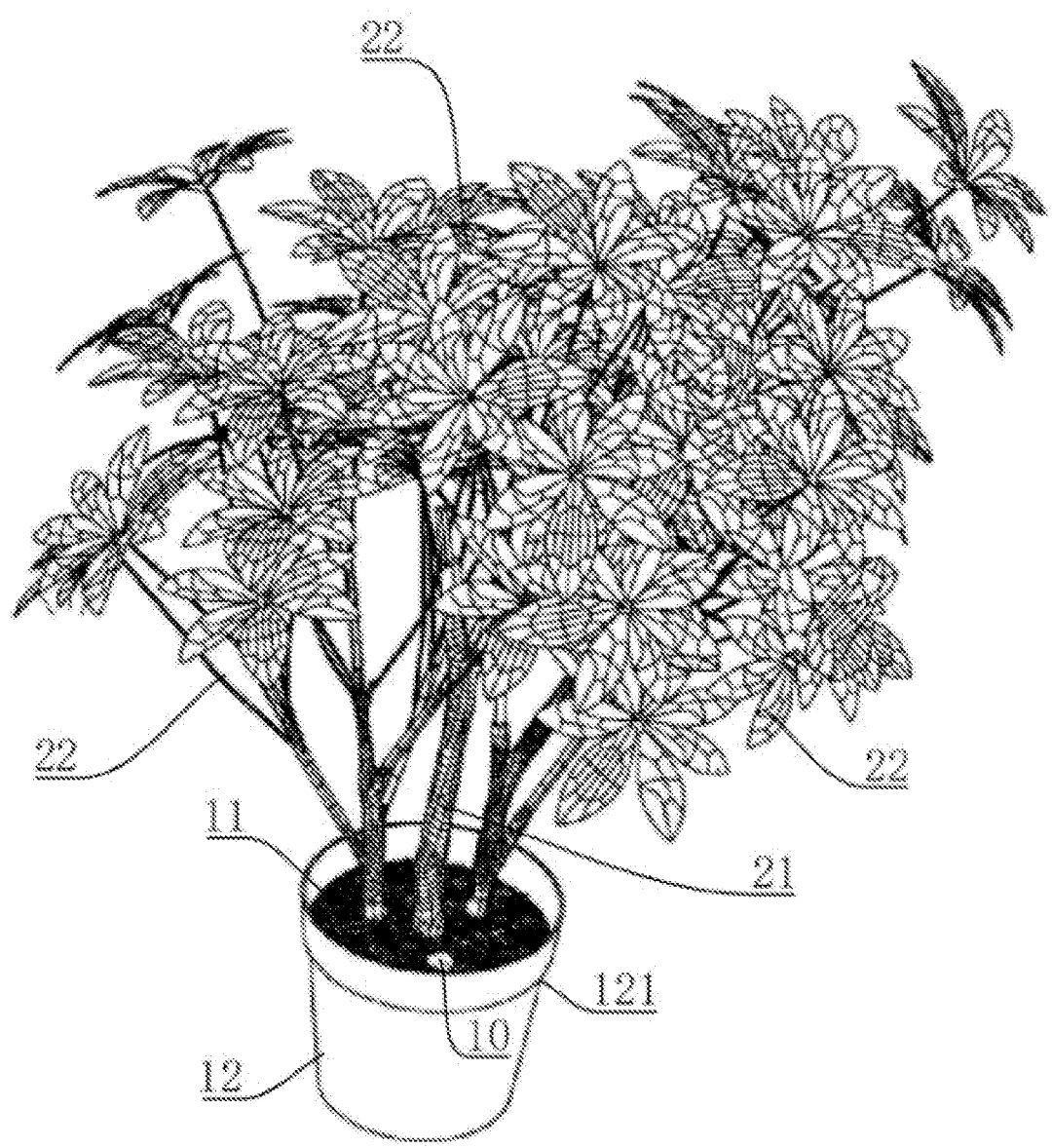
FIG. 5 is a structural schematic diagram of a fourth installation state of an assembled simulation potted plant in the present disclosure.

Referring to FIG. 5, which is a structural schematic diagram of a fourth installation state of an assembled simulation potted plant in the present disclosure. The first plant 21 is plugged on one third connecting portion 10 in the pot body, one second plant 22 is plugged on the first plant 21, and the remaining two plants 22 are both plugged on the third connecting portions 10 in the pot body.

Figure 6:
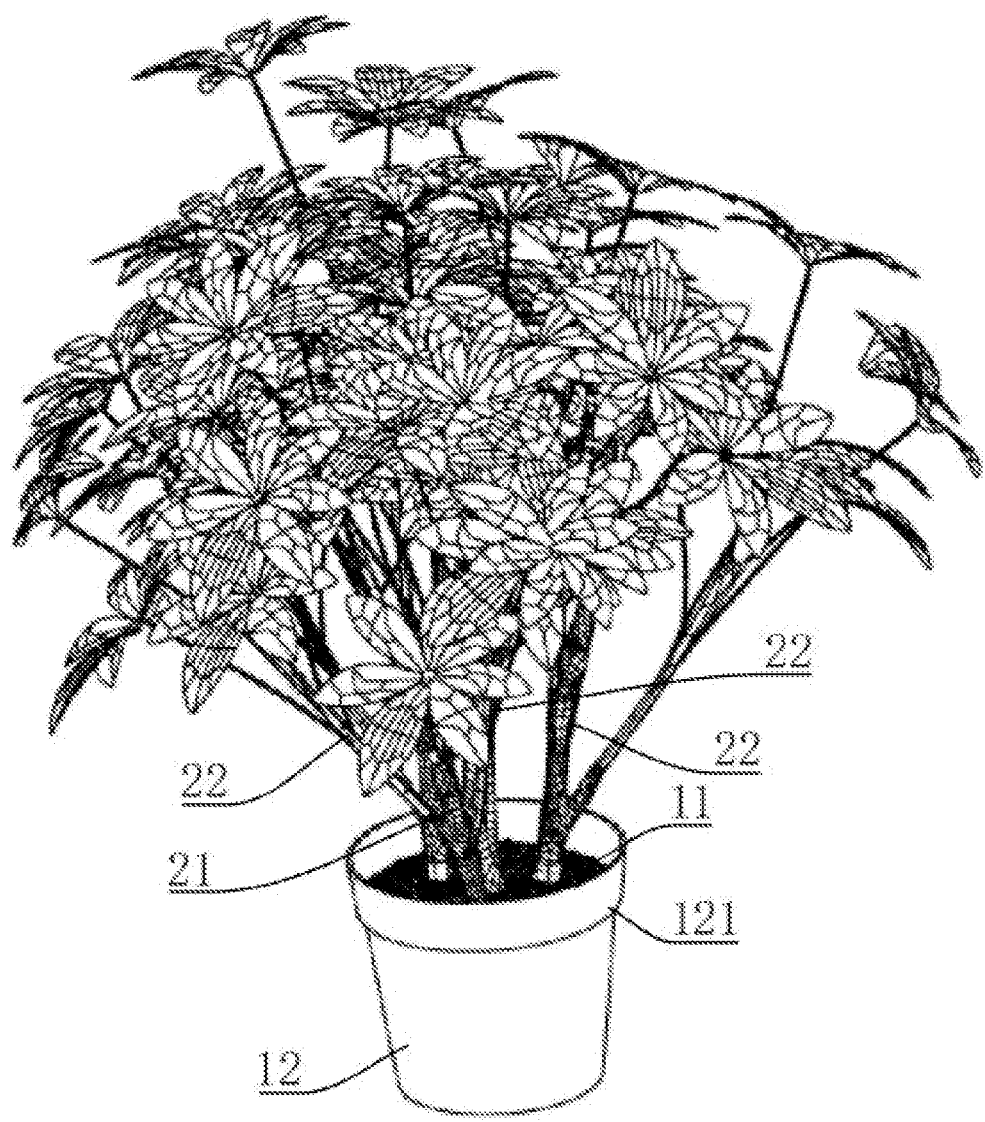
FIG. 6 is a structural schematic diagram of a fifth installation state of an assembled simulation potted plant in the present disclosure.

Referring to FIG. 6, which is a structural schematic diagram of a fifth installation state of an assembled simulation potted plant in the present disclosure. The first plant 21 and the three second plants 22 are all plugged on the third connecting portions 10 in the pot body, and at this time the assembled simulation potted plant has the maximum horizontal dimension.

Referring to FIGS. 8 to 12, further including male plugs 100 and female plugs the male plugs 100 are fixedly connected to one ends of the plants, the female plugs 20 are fixedly connected to the other ends of the plants, and the male plugs 100 are plugged with the female plugs 20; and the male plugs 100 and the female plugs 20 are made of engineering plastics or metal. The material of the male plugs 100 and the female plugs 20 is different from that of the plants. The male plugs 100 and the female plugs 20 are made of engineering plastics or metal, the material itself has better hardness, so that the plugging position is not easy to deform, and the plugging method is more reliable.

The male plugs 100 and the female plugs 20 are integrally molded with the plants through inlaying injection molding, with the purpose of fixedly connecting the plugs to the corresponding branches.

One of the male plugs 100 and the female plugs 20 is equipped with an installation groove while the other is equipped with a round hole 201; a throat is disposed at a top of the installation groove, a spring and a steel ball 101 are installed inside the installation groove, an outer diameter of the steel ball 101 is greater than a diameter of the throat, the steel ball 101 can stretch out of the throat partially and be affixed to the round hole 201 under the thrust action of the spring, and the steel hall 101 is used for affixing the round hole 201 so as to prevent the male plugs 100 from loosening up and down.

One of the male plugs 100 and the female plugs 20 is equipped with a positioning column 102 while the other is equipped with a groove 202 fitting with the positioning column 102; and the position between the positioning column 102 and the steel ball 101 is relatively fixed, and when the positioning column 102 is inserted into the groove 202, the steel ball 101 can be affixed to the round hole 201. In combination with the positioning action between the positioning column 102 and the groove 202 and the fixing action between the steel ball 101 and the round hole 201, the male plugs 100 can be directionally and fixedly plugged on the female plugs 20, and the user can plug the plants according to the plugging direction between the positioning column 102 and the groove 202.

One end that each male plug 100 is closed to each plant is equipped with a first plugging portion 103, one end that each male plug 100 is away from each plant is equipped with a second plugging portion 104, and the positioning column 102 is disposed on the first plugging portion 103; the installation groove, the steel ball 101 and the spring are all installed on the second plugging portion 104, and a longitudinal sectional area of the first plugging portion 103 is greater than that of the second plugging portion 104; and a third plugging portion 203 fitting with the first plugging portion 103 is disposed in each female plug 20, a fourth plugging portion 204 fitting with the second plugging portion 104 is disposed in each female plug 20, the first plugging portion 103 is plugged with the third plugging portion 203, the second plugging portion 104 is plugged with the fourth plugging portion 204, and at least one place between the first plugging portion 103 and the third plugging portion 203 is in transition fit with at least one place between the second plugging portion 104 and the fourth plugging portion 204, so as to prevent the male plugs 100 from loosening in a horizontal direction. The contact area between the male plugs 100 and the female plugs 20 is increased by setting the first plugging portion 103 and the second plugging portion 104 with different outer diameters, thereby further improving the assembly stability.

A first spherical surface 105 is disposed at a root of each male plug 100, a second spherical surface 205 that fits with the first spherical surface 105 and sinks inwards is disposed at a top of each female plug 20, and the first spherical surface 105 fits with the second spherical surface 205. The contact area of the plugging surfaces is increased by fitting the first spherical surface 105 with the second spherical surface 205, thereby further improving the assembly stability.

A first plane 3 is disposed at an edge of the first spherical surface 105, a second plane 4 is disposed at an edge of the second spherical surface 205, the first plane 3 fits with the second plane 4, and an outer diameter of the first plane 3 is equal to that of the second plane 4. Fitting the first plane 3 with the second plane 4 can conceal the plugging part, so that the potted plant or plant has a more beautiful appearance.

The male plugs 100 and the female plugs 20 are all prismatic, and longitudinal sections of the male plugs 100 and the female plugs 20 are mutually matched polygonal structures. Compared with a cylinder, the polygonal structures can limit the plant to move on another plant, so that the plant can be directly inserted into another plant, the clamping part is not needed to search by rotating, and the plugging efficiency is improved. Four side walls in the female plugs 20 are all equipped with the round holes 201, and the purpose of this design is to process conveniently and improve the processing efficiency.

In the description of the present disclosure, it is understood that orientation or position relationships indicated by the terms "upper", "lower", "front", "rear", "left", and "left", and the like are based on the orientation or position relationships as shown in the drawings, for ease of describing the present disclosure and simplifying the description only, rather than indicating or implying that the mentioned apparatus or element necessarily has a particular orientation and must be constructed and operated in the particular orientation. Therefore, these terms should not be understood as limitations to the present disclosure.

In the description of the present disclosure, the meaning of "several" is one or more, the meaning of "a plurality" is more than two, "greater than", "less than", "exceeding" and the like are understood as excluding the original number, and "above", "below", "within" and the like are understood as including the original number. The described "first" and "second" are merely used for distinguishing technical features, instead of being understood as indicating or implying relative importance or impliedly indicating the quantity of the showed technical features or impliedly indicating the precedence relationship of the showed technical features.

In the description of the present disclosure, unless specific limitation otherwise, terms "set", "install", "join" and the like should be generally understood. Those of ordinary skill in the art may reasonably determine the specific meaning of the terms in the present disclosure in combination with the specific contents of the technical solution.

The above is the preferred embodiment of the present disclosure, instead of limiting the patent scope of the present disclosure. Without departing from the concept of the present disclosure, the equal structural transformations made according to the contents of the specification and the drawings or direct/indirect application in other related technical fields fall within the scope of protection of the present disclosure.

What is claimed is:

1. An assembled simulation potted plant, comprising:
   a pot body and plants;
   third connecting portions are disposed on the pot body;
   at least two plants are provided, first connecting portions are disposed at lower parts of the plants, and second connecting portions are disposed at upper parts of the plants;
   the second connecting portions and the third connecting portions are both fitted with the first connecting portion; and
   the quantity of the second connecting portions on the same plant and the quantity of the third connecting portions on the same pot body are multiple.

2. The assembled simulation potted plant according to claim 1, wherein
   the plants comprise a first plant, on which at least two second connecting portions are disposed.

3. The assembled simulation potted plant according to claim 2, wherein
   the plants also comprise second plants, only one second connecting portion is disposed at an upper part of each of the second plants.

4. The assembled simulation potted plant according to claim 3, wherein
   the quantity of the second plants is at least two, and leaves are disposed on the at least two second plants.

5. The assembled simulation potted plant according to claim 1, wherein
the third connecting portions and the first connecting portions are all hole-shaped, the second connecting portions are columnar, the third connecting portions and the second connecting portions are all plugged with the first connecting portions.

6. The assembled simulation potted plant according to claim 1, wherein
positioning bulges are disposed on the first connecting portions, positioning grooves fitting with the positioning bulges are formed in the second connecting portions, and the positioning bulges are plugged in the positioning grooves.

7. The assembled simulation potted plant according to claim 1, wherein
the pot body comprises a main pot and a filling member disposed in the main pot, and the third connecting portions are disposed on the filling member.

8. The assembled simulation potted plant according to claim 7, wherein
the filling member is sheet-like, a step is disposed at an upper part of the main pot, and the filling member is placed on the step.

9. The assembled simulation potted plant according to claim 1, further comprising:
male plugs and female plugs, wherein one of the male plugs and the female plugs are fixed on the first connecting portions, and another one of the male plugs is fixed on the second connecting portions; and
the male plugs and the female plug are made of engineering plastics or metal.

10. The assembled simulation potted plant according to claim 9, wherein
the male plugs and the female plugs are integrally molded with the plants through inlaying injection molding.

11. The assembled simulation potted plant according to claim 9, wherein
one of the male plugs and the female plugs are equipped with an installation groove, and another one of the male plugs is equipped with a round hole; and
a throat is disposed at a top of the installation groove, a spring and a steel ball are installed inside the installation groove,
an outer diameter of the steel ball is greater than a diameter of the throat, and the steel ball is capable of stretching out of the throat partially and affixed to the round hole under a thrust action of the spring.

12. The assembled simulation potted plant according to claim 11, wherein
one of the male plugs and the female plugs are equipped with a positioning column, and another one of the male plugs is equipped with a groove fitting with the positioning column; and
when the positioning column is inserted into the groove, the steel ball is capable of being plugged with the round hole.

13. The assembled simulation potted plant according to claim 12, wherein
one end of each of the male plugs closed to each of the plants is equipped with a first plugging portion, one end of each of the male plugs away from each of the plants is equipped with a second plugging portion, and the positioning column is disposed on the first plugging portion;
the installation groove, the steel ball and the spring are all installed on the second plugging portion, and a longitudinal sectional area of the first plugging portion is greater than that of the second plugging portion; and
a third plugging portion fitting with the first plugging portion is disposed in each of the female plugs,
a fourth plugging portion fitting with the second plugging portion is disposed in each of the female plugs,
the first plugging portion is plugged with the third plugging portion, the second plugging portion is plugged with the fourth plugging portion, and at least one place between the first plugging portion and the third plugging portion is in transition fit with at least one place between the second plugging portion and the fourth plugging portion.

14. The assembled simulation potted plant according to claim 9, wherein
a first spherical surface is disposed at a root of each of the male plugs, a second spherical surface fitting with the first spherical surface is disposed at a top of each of the female plugs, and the first spherical surface fits with the second spherical surface.

15. The assembled simulation potted plant according to claim 14, wherein
a first plane is disposed at an edge of the first spherical surface,
a second plane is disposed at an edge of the second spherical surface,
the first plane fits with the second plane, and an outer diameter of the first plane is equal to that of the second plane.

16. The assembled simulation potted plant according to claim 9, wherein
the male plugs and the female plugs are all prismatic.

* * * * *